Jan. 5, 1926.   1,568,058
C. L. CHARLES ET AL
RAILWAY CAR TRUCK
Filed Jan. 7, 1925

INVENTORS
Carl L. Charles
Percy R. Drenning
BY
John W. Darley
ATTORNEY

Patented Jan. 5, 1926.

1,568,058

UNITED STATES PATENT OFFICE.

CARL L. CHARLES AND PERCY R. DRENNING, OF BALTIMORE, MARYLAND, ASSIGNORS, BY MESNE ASSIGNMENTS, TO HERBERT M. BRUNE, CHARLES E. SCARLETT, AND JANON FISHER, TRUSTEES, ALL OF BALTIMORE, MARYLAND.

RAILWAY-CAR TRUCK.

Application filed January 7, 1925. Serial No. 947.

*To all whom it may concern:*

Be it known that we, CARL L. CHARLES and PERCY R. DRENNING, citizens of the United States, residing at Baltimore, in the State of Maryland, have invented certain new and useful Improvements in Railway-Car Trucks; and we do hereby declare the following to be a full, clear, and exact description of the invention, such as will enable others skilled in the art to which it appertains to make and use the same.

Our invention relates to railway car trucks.

Our improved truck comprises six wheels mounted upon three axles and each axle is revolubly mounted in a member. The pilot and trailer members are connected to the central member by what is substantially a ball and socket joint so that each member may move vertically and transversely horizontally without producing a corresponding movement of either or both of the other members.

Means are also provided for producing a horizontal coordinating action of the wheels and journals so that the wheels will conform to the coutour of the rails whatever it may be, and so that the angular position of the central axle will be coordinated to the position of either or both the pilot and trailer axles.

The horizontal coordinating action involved in our improved truck is clearly illustrated and explained and the method and means by which said action is effectuated is set forth in U. S. Letters Patent No. 1,341,776, issued June 1st, 1920.

In combination with the horizontal coordinating action just referred to, our improved truck involves equalized vertical actions of the several members of the truck and the method of accomplishing the horizontal coordinating action of truck members in combination with an equalized vertical action thereof is set forth in U. S. Letters Patent No. 1,341,777, issued June 1st, 1920. In the last-named Letters Patent there is also set forth one means for effecting the horizontal coordinating action of the several members in combination with an equalized vertical action thereof.

Among the objects of our invention are:—

To produce a truck having a member which acts to coordinate the mutual angularity of the axles in a horizontal plane and which also serves to transmit the load to the end members through friction-reducing elements.

To produce a truck having a member with the foregoing characteristics which also serves to transmit the vertical load to the end members in such positions that said load always acts in such locations as to produce a pressure of the wheels of the end members upon the rails.

To produce a truck having a member of the class described which possesses rigidity in a horizontal plane, but is so constructed and arranged that the elements thereof may have relative vertical movement.

One example of our improved truck is shown in the accompanying drawings for purposes of illustration.

In the drawings:—

Figure 1:
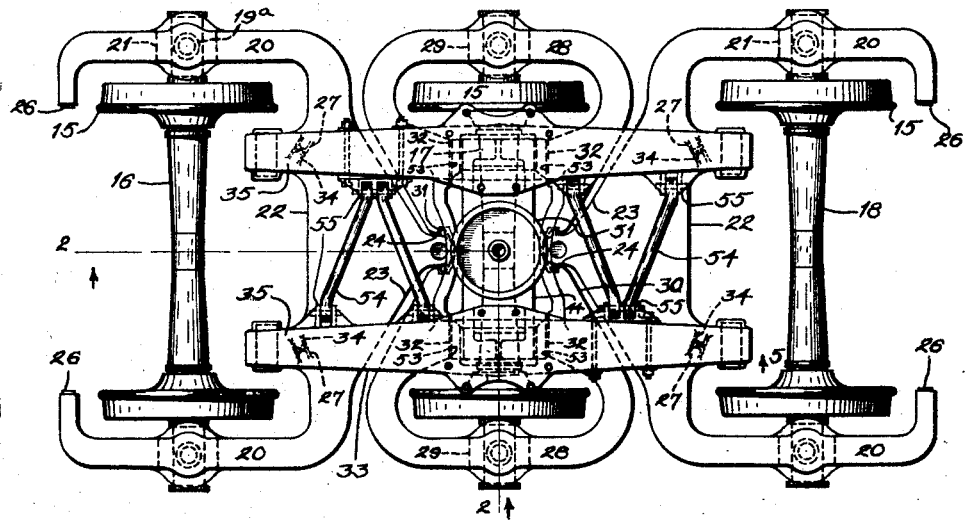
Figure 1 is a plan view of a six wheel truck constructed according to our invention, the side bearings being omitted for the sake of clearness.
Figure 2:
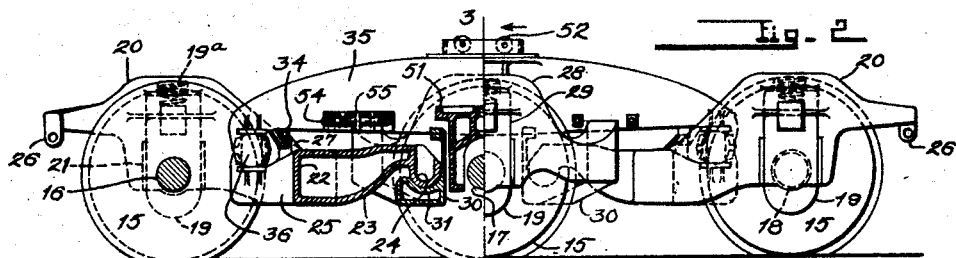
Fig. 2 is a section along the line 2—2 in Fig. 1 looking in the direction of the arrows.

15 represents the wheels and 16, 17 and 18 represent, respectively, the pilot, central and trailer axles.

The journals of the axles are mounted in any approved form of axle box such as 19 and the wheels and axles are of American Railway Association standards.

Each pilot and trailer bolster consists of a pair of pedestals such as 20, each pedestal being provided with a recess having jaws 21 for the reception of the axle box 19 which slides freely therein and springs 19ᵃ are placed between each axle box and the top of the corresponding recess. The pedestals 20—20 of each end member are joined together by a frame 22 and said frame is provided with an extension 23 terminating in the boss 24 having a hemispherical lower surface.

The frame 22 is provided with two bases 25—25 for a purpose hereinafter explained and with ears 26—26 for the support of brake parts. The brake parts forming no part of our present invention are not illustrated or described. Each frame 22 is further provided with a pair of rocker bearings 27—27 for a purpose hereinafter explained.

The central bolster consists of a pair of pedestals such as 28—28, each pedestal being provided with a recess having jaws 29 for the reception of the axle box 19 which has free vertical movement therein, and springs 19$^a$ are placed between each axle box and the top of the corresponding recess. The pedestals 28—28 of the central bolster are joined together by the frame 30 and said frame may be provided with ears for the support of brake parts.

The frame 30 is provided on each side with a socket 31 having a hemispherical bottom. One of the bosses 24 is introduced in each of the sockets 31 and serves to connect the corresponding pilot and trailer bolsters with the central bolster. The frame 30 is further provided with four true surfaces 32 for a purpose hereinafter explained.

It is to be noted that by reason of the shape of the boss 24 and the socket 31, the pilot and trailer bolsters, in addition to revolving in a horizontal plane around the axis of said socket, can move vertically and also angularly in vertical planes. Thus, each of the pilot and trailer bolsters is articulated with the central bolster by a universal joint.

The coordinating bolster 33 is provided with four bearings 34 which contact with the rocker bearings 27. The bearings 34 are formed upon the longitudinal beams 35—35 of the coordinating bolster 33, said beams also extending over the friction reducing elements 36, one of said elements being mounted between each end of the beams 35—35 and the corresponding base 25.

Figures 3, 7:
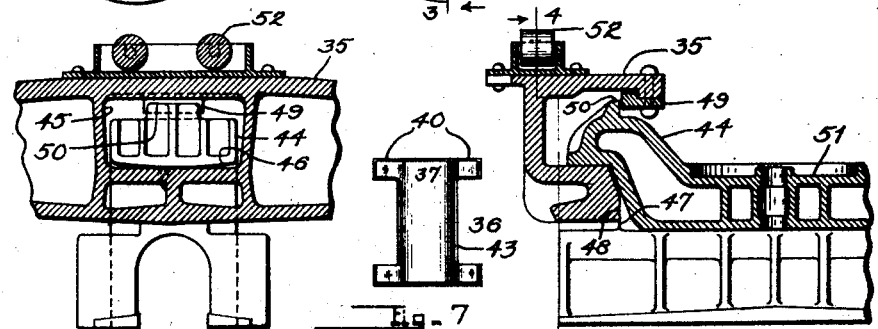
Fig. 3 is a sectional elevation of a portion of our truck along the line 3—3 in Fig. 2 looking in the direction of the arrow.
Fig. 7 is a plan view of the friction reducing element looking in the direction of the arrow 7 in Fig. 5.

The friction reducing element 36 is substantially I-shaped when viewed as in Fig. 7 and is provided with curved surfaces 37—37 at the bottom and top thereof. The surface at the bottom of each element 36 rests upon a wearing plate 38 secured in any approved manner to the base 25 and the end of the corresponding side frame 35, to which is secured in any approved manner the wearing plate 39, bears upon the top surface of said element. The element 36 is further provided on each end thereof with stops 40—40 which engage with the flanges 41—41 and 42—42 formed on the beam 35 and base 25, respectively, in order to prevent undue endwise movement of said element with reference to said beam and base. Said stops also serve a further purpose hereinafter explained. Undue angular displacement of the element 36 with reference to the beam 35 and base 25 is prevented by the engagement of the body portion 43 of said element with the inner surfaces of the flanges 41 and 42.

Figures 4, 5, 6:
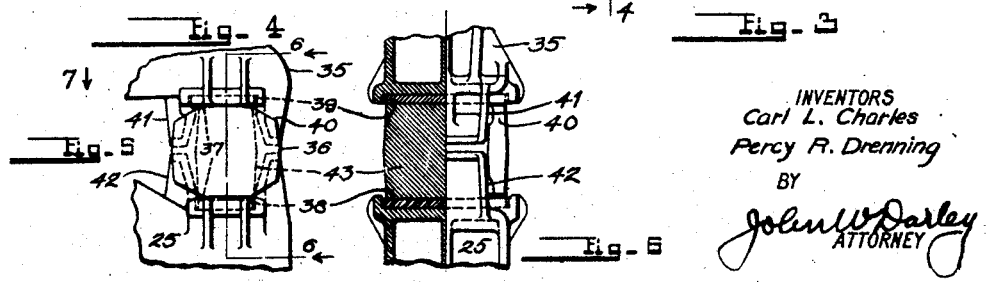
Fig. 4 is a section along the line 4—4 in Fig. 3 looking in the direction of the arrows.
Fig. 5 is an enlarged side view of one of the friction reducing elements when viewed in the direction of the arrow 5 in Fig. 1.
Fig. 6 is a view looking in the direction of the arrows in Fig. 5 said view being partly in section along the line 6—6.

In addition to the longitudinal beams 35—35 above noted, the coordinating bolster 33 comprises a central member 44, the ends of which are inserted within openings 45 provided in said beams and bear upon the latter. In order to permit of vertical rocking action of the beams 35 with respect to the central member 44, the bearing surfaces on the ends of said member are curved as shown at 46 in Fig. 4. The openings 45 have sufficient length that the member 44 may be easily engaged with the beams 35 and so as to allow of the rocking movement above referred to, but not enough to permit undue horizontal displacement of said member relative to said beam. Transverse movement of the member 44 relative to the beams 35 is prevented by a vertical bearing surface 47 provided on each member 44 which coacts with a similar bearing surface 48 on each beam 35. A stop plate 49 is secured to the underside of the beam 35 for a purpose hereinafter explained and said plate is adapted to coact with a nose 50 formed on the member 44.

The center plate 51 supports the car body in any approved manner and the coordinating bolster 33 with reference to the car body may swing angularly about said plate. Any approved form of side bearings such as 52 may be interposed between said body and the coordinating bolster. Further, the central member 44 is provided with four gibs 53 true on the outer surface thereof, which project downwardly and each has a sliding bearing upon one of the true surfaces 32 of the frame 30, thus connecting the coordinating bolster and the central bolster together in such manner that while the former can have angular movement in a vertical plane and vertical and transverse movements with reference to the latter, yet the latter is forced to partake of the angular movement in a horizontal plane of the former.

Each of the bearings 34 of the coordinating bolster 33 may have longitudinal movements as well as angular movements within the corresponding rocker bearings 27.

In order to maintain the horizontal rigidity of the coordinating bolster and to secure its flexibility in vertical planes we preferably employ the triangulated trusses 54, as shown in Fig. 1. Said trusses are secured to the beams 35 in such a manner that the latter can have no relative horizontal, but are capable of relative vertical movement. One method of securing the trusses 54 is shown in Fig. 1, in which the ends of said trusses are pivotally mounted between ears 55 formed on the beams 35. The trusses 54 are arranged on either side of the member 44 so that the coordinating bolster 33 may be reversed in direction without affecting its mode of operation. Moreover, it will be noted that the trusses 54, in addition to serving as a means of articulating the longitudinal beams together, resist transverse forces operating upon said beams.

It is to be understood, however, that the trusses, as shown, are for the purposes of illustration only, for the spirit of our invention includes any means whereby the coordinating bolster is rendered rigid horizontally, but the elements thereof may have relative movement in vertical planes.

The operation of our improved truck is as follows:—

The pilot, central and trailer bolsters act coordinately horizontally according to the method set forth in U. S. Letters Patent No. 1,341,776, referred to above, with the exception that each pilot and trailer bolster is joined by a ball and socket joint to the central bolster on the near side thereof. Movements of the pilot, trailer and central bolsters with reference to the coordinating bolster which are permitted by the ball and socket joints connecting the pilot and trailer bolsters to the central bolster insure the utmost freedom of the wheels in following the vertical contour of the rails. As set forth in U. S. Letters Patent No. 1,341,776, the coordinating movements of the members provide for the utmost freedom of the wheels in following the horizontal contour of the track.

Under working conditions, the vertical load from the car body is applied to the coordinating bolster 33 upon the centre plate 51 and this load is then distributed to the beams 35—35, thence through the friction reducing elements 36 to the bases 25; from the bases 25, portions of the load are delivered to the pilot and trailer wheels and the remainder is delivered to the central wheels through the ball and socket joints connecting the pilot and trailer bolsters to the central bolster, the various parts being so proportioned and located that the loads upon the wheels are approximately equal, when the wheels are upon a level track and the car body is symmetrical with respect to the truck.

However, if the wheels on one side of the truck are lower than the wheels on the opposite side, or if the car body is asymmetrical with respect to the truck, then the load as finally applied to the end wheels will be greater on one side, but whatever such load may be, that on the same side of the truck will be distributed approximately equally to the end wheels on that side, by reason of our improved construction.

Due to the fact that the central bolster is loaded midway between the wheels, said wheels are equally loaded, whether the weight of the car body and its contents be considered alone or in conjunction with the forces set up by the oscillation of the body, and whether the wheels on one side of the truck are lower than those on the opposite side, or if the car body is asymmetrical with respect to the truck. The load on each wheel of the central bolster, aside from such forces, will therefore be a constant quantity and will be equal to, greater, or less than that applied to any end wheel depending upon the nature of the loading.

Further, it is to be noted that if, due to irregularities in the elevation of the track, any two diagonally opposite end wheels should be higher than the other two diagonally opposite end wheels, that nevertheless, our improved truck will readily conform to these conditions, and by reason of the vertical flexibility of our coordinating bolster will transmit approximately equal loads to each of the wheels.

In brief, that member of the truck which receives the initial application of the load is so constructed and arranged that it adjusts itself to the contour of the track and by reason of that adjustability insures that each wheel will receive its proper proportion of the total load.

Moreover, any turning movement created by side bearing loads on the frames 35—35 caused by an abnormal load thereon is prevented by the interaction of the plate 49 and nose 50.

As either the pilot or trailer bolster moves angularly with respect to the central bolster, it turns about its ball and socket joint and by means of the stops 40 on the friction reducing elements 36 moves the corresponding end of the coordinating bolster 33 about an axis substantially midway between the elements 36 at the other end of said coordinating bolster. The angular movements of the pilot or trailer bolster and the coordinating bolster being about axes that are not coaxial, it is evident that a sliding shifting movement takes place between the rocker bearings 27 and the bearings 34, which are angularly inclined, as shown in Fig. 1, to accord with the true relative movement of said bolsters. It is the function of the friction reducing element 36 during this action to permit of the free movement of the coordinating bolster relative to either the pilot or trailer bolster, in addition to providing a means whereby the pilot or trailer bolsters control the movement of the coordinating bolster. Additional means of controlling the latter bolster are afforded by the bearings 27 and 34, which are utilized in the event of the failure of the stops 40 on the friction reducing elements 36.

Thus, the truck illustrated and described herein provides for the minimization of the friction due to the vertical and transverse stresses against the rails and thus insures a minimization of the longitudinal stress against the draw bar of the locomotive.

While we have shown one preferred form of our improved truck for illustrating our invention, it is to be understood that the same is not to be considered as limited to the structure shown, for changes may be made therein without departing from the spirit of our invention.

We claim:—

1. In a six wheel truck, the combination with a bolster for each pair of journals, a vertically flexible, horizontally rigid coordinating bolster engaging with the central bolster and with each of the pilot and trailer bolsters to control the mutual angularity of said journals, friction reducing elements between said coordinating bolster and said pilot and trailer bolsters and a ball and socket joint between each of said pilot and trailer bolsters and said central bolster.

2. In a six wheel truck, the combination with a bolster for each pair of journals, a vertically flexible, horizontally rigid coordinating bolster engaging with the central bolster and with each of the pilot and trailer bolsters to control the mutual angularity of said journals, rocking friction reducing elements between said coordinating bolster and said pilot and trailer bolsters and a ball and socket joint between each of said pilot and trailer bolsters and said central bolster.

3. In a six wheel truck, the combination with a bolster for each pair of journals, a vertically flexible, horizontally rigid coordinating bolster engaging with the central bolster and with each of the pilot and trailer bolsters to control the mutual angularity of said journals, said pilot and trailer bolsters comprising bases, friction reducing elements mounted on said bases, said coordinating bolster comprising longitudinal beams supported by said elements, and a ball and socket joint between each of said pilot and trailer bolsters and said central bolster.

4. In a six wheel truck for railway cars, the combination with a bolster for each pair of journals, a vertically flexible, horizontally rigid coordinating bolster, having side bearings for the car body, engaging with the central bolster and with each of the pilot and trailer bolsters to control the mutual angularity of said journals, friction reducing elements between said coordinating bolster and said pilot and trailer bolsters and a ball and socket joint between each of said pilot and trailer bolsters and said central bolster.

5. In a six wheel truck for railway cars, the combination with a bolster for each pair of journals, a vertically flexible, horizontally rigid coordinating bolster comprising a center plate and side bearings for the car body engaging with the central bolster and with each of the pilot and trailer bolsters to control the mutual angularity of said journals, friction reducing elements between said coordinating bolster and said pilot and trailer bolsters and a ball and socket joint between each of said pilot and trailer bolsters and said central bolster.

6. In a six wheel truck, the combination with a bolster for each pair of journals, a vertically flexible, horizontally rigid coordinating bolster engaging with the central bolster and with each of the pilot and trailer bolsters to control the mutual angularity of said journals, said pilot and trailer bolsters each comprising bases provided with spaced flanges, said coordinating bolster comprising longitudinal beams having ends provided with spaced flanges extending over said bases, a friction reducing element mounted between the flanges of each of said bases and of the corresponding end of each of said beams, said element comprising stops extending over the ends of said flanges, thereby providing engaging means between said pilot and trailer bolsters and the coordinating bolster, and a ball and socket joint between each of said pilot and trailer bolsters and said central bolster.

7. In a six wheel truck for railway cars, the combination with a bolster for each pair of journals comprising pedestals, journal boxes slidably mounted in said pedestals, springs between said pedestals and boxes, a vertically flexible, horizontally rigid coordinating bolster engaging with the central bolster and with each of the pilot and trailer bolsters to control the mutual angularity of said journals, friction reducing elements between said coordinating bolster and said pilot and trailer bolsters, a ball and socket joint between each of said pilot and trailer bolsters and said central bolster and means on said coordinating bolster for supporting the car body.

8. In a six wheel truck, the combination with a bolster for each pair of journals, a vertically flexible, horizontally rigid coordinating bolster engaging with the central bolster and with each of the pilot and trailer bolsters to control the mutual angularity of said journals, said pilot and trailer bolsters comprising bases located between the flanges on the wheels, friction reducing elements mounted on said bases, said coordinating bolster comprising longitudinal beams supported by said elements, and a ball and socket joint between each of said pilot and trailer bolsters and said central bolster.

9. In a six wheel truck having pilot, trailer and central bolsters each comprising pedestals, the combination with a vertically flexible, horizontally rigid structure subjected to the vertical load, of a flexible connection between said pilot and trailer bolsters and said central bolster, journal boxes slidably mounted in said pedestals, springs between said pedestals and boxes and friction reducing elements between said structure and said pilot and trailer bolsters for transmitting said load from said structure to said pilot and trailer bolsters.

10. In a six wheel truck having pilot, trailer and central bolsters each comprising pedestals, the combination with a vertically flexible, horizontally rigid structure subjected to the vertical load and engaging said bolsters to coordinate the mutual angularity of the axles, of a flexible connection between said pilot and trailer bolsters and said central bolster, journal boxes slidably mounted in said pedestals, springs between said pedestals and boxes and friction reducing elements between said structure and said pilot and trailer bolsters for transmitting said load from said structure to said pilot and trailer bolsters.

11. In a six wheel truck, the combination with a bolster for each pair of journals, of a vertically flexible, horizontally rigid coordinating bolster engaging with the central bolster, rocker bearings on the pilot and trailer bolsters, and bearings on said coordinating bolster engaging said rocker bearings.

12. In a six wheel truck, the combination with a bolster for each pair of journals, of a vertically flexible, horizontally rigid coordinating bolster engaging with the central bolster, rocker bearings on the pilot and trailer bolsters, bearings on said coordinating bolster engaging said rocker bearings, and friction reducing elements between said coordinating bolster and said pilot and trailer bolsters adjacent said bearings.

13. In a six wheel truck, the combination with a bolster for each pair of journals, a vertically flexible, horizontally rigid coordinating bolster engaging with the central bolster and with each of the pilot and trailer bolsters to control the mutual angularity of said journals, said coordinating bolster comprising a central member engaging with the central bolster, longitudinal beams adapted to have vertical rocking engagement with the ends of said central member, means to prevent the relative horizontal movement of said central member and beams, but permitting their relative vertical action, friction reducing elements between said coordinating bolster and said pilot and trailer bolsters and a ball and socket joint between each of said pilot and trailer bolsters and said central bolster.

14. In a six wheel truck, the combination with a bolster for each pair of journals, a vertically flexible, horizontally rigid coordinating bolster engaging with the central bolster and with each of the pilot and trailer bolsters to control the mutual angularity of said journals, said coordinating bolster comprising a central member engaging with the central bolster, longitudinal beams adapted to have vertical rocking engagement with the ends of said central member, a triangulated truss positioned on each side of said member between said beams and having its ends pivotally secured to said beams so that said beams are relatively fixed in a horizontal plane, but are capable of relative vertical movements, friction reducing elements between said coordinating bolster and said pilot and trailer bolsters and a ball and socket joint between each of said pilot and trailer bolsters and said central bolster.

In testimony whereof, we affix our signatures.

CARL L. CHARLES.
PERCY R. DRENNING.